US012493791B2

(12) United States Patent
Song et al.

(10) Patent No.: US 12,493,791 B2
(45) Date of Patent: Dec. 9, 2025

(54) DIALOG AGENTS WITH TWO-SIDED MODELING

(71) Applicant: The Hong Kong University of Science and Technology, Kowloon (HK)

(72) Inventors: Yangqiu Song, Kowloon (HK); Haoran Li, Henan (CN); Ying Su, Kowloon (HK); Qi Hu, Zhejiang (CN); Jiaxin Bai, Kowloon (HK); Yilun Jin, Kowloon (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 704 days.

(21) Appl. No.: 17/866,263

(22) Filed: Jul. 15, 2022

(65) Prior Publication Data

US 2023/0050655 A1      Feb. 16, 2023

Related U.S. Application Data

(60) Provisional application No. 63/229,490, filed on Aug. 4, 2021.

(51) Int. Cl.
*G06N 3/08*        (2023.01)
*G06F 16/3329*     (2025.01)
*G06F 40/35*       (2020.01)

(52) U.S. Cl.
CPC ........... *G06N 3/08* (2013.01); *G06F 16/3329* (2019.01); *G06F 40/35* (2020.01)

(58) Field of Classification Search
CPC ........ G06N 3/08; G06N 3/044; G06N 3/0455; G06N 3/084; G06N 3/098; G06F 16/3329; G06F 40/35
See application file for complete search history.

(56) References Cited

U.S. PATENT DOCUMENTS 10,380,380 B1    8/2019  Abdi Taghi Abad et al.
11,238,849 B1 *  2/2022  Mimassi ................. G10L 15/07
(Continued)

FOREIGN PATENT DOCUMENTS

CN    107667362 A    2/2018
CN    108604222 A    9/2018
(Continued)

OTHER PUBLICATIONS

Aji et al., "Sparse Communication for Distributed Gradient Descent", arXiv preprint, arXiv:1704.05021v2, 2017, 6 pages.
(Continued)

*Primary Examiner* — Athar N Pasha
(74) *Attorney, Agent, or Firm* — Amin, Turocy & Watson, LLP

(57) ABSTRACT

A central learning model is deployed as a user model and as an assistant model. Sensitive information utterances from a corpus of previously stored conversation language corresponding to user queries and chat agent responses thereto are used to train the user model to become an updated user model and to train the assistant model to become an updated assistant model, respectively. The user model provides user contexts corresponding to user queries to the assistant model and the assistant model provides assistant contexts corresponding to chat agent responses to the user model. During training, the user model does not provide plain-text queries to the assistant model and the assistant model does not provide plain-text responses to the user model. The updated assistant model may facilitate a federated training process produce an updated central model. An updated central model may be used to provide real-time chat agent responses to live user queries.

20 Claims, 10 Drawing Sheets

(56) References Cited

U.S. PATENT DOCUMENTS

| | | | |
|---|---|---|---|
| 11,694,281 | B1 | 7/2023 | Liu et al. |
| 2016/0035353 | A1 | 2/2016 | Chen et al. |
| 2020/0357403 | A1* | 11/2020 | Chen .................. G10L 13/033 |
| 2021/0117780 | A1 | 4/2021 | Malik et al. |
| 2021/0168195 | A1 | 6/2021 | O et al. |
| 2021/0304062 | A1* | 9/2021 | Rajamoni .............. G06N 20/00 |
| 2022/0100798 | A1* | 3/2022 | Donaldson ............ G06F 40/205 |
| 2022/0383857 | A1* | 12/2022 | Le Groux .............. G06N 3/044 |
| 2023/0018116 | A1* | 1/2023 | Walsh .................... G06F 21/60 |
| 2024/0266074 | A1* | 8/2024 | Smurro .................. G16H 80/00 |

FOREIGN PATENT DOCUMENTS

| | | |
|---|---|---|
| CN | 110990871 A | 4/2020 |
| CN | 111190487 A | 5/2020 |
| CN | 109033854 B | 6/2020 |
| CN | 111931223 A | 11/2020 |
| CN | 112189192 A | 1/2021 |
| CN | 109325584 B | 6/2021 |
| GB | 2556981 A | 6/2018 |

OTHER PUBLICATIONS

Alistarh et al., "QSGD: Communication-Efficient SGD via Gradient Quantization and Encoding", Advances in Neural Information Processing Systems, vol. 30, 2017, pp. 1709-1720.

Bengio et al., "A Neural Probabilistic Language Model", Journal of Machine Learning Research, vol. 3, 2003, pp. 1137-1155.

Bernstein et al., "signSGD: Compressed Optimisation for Non-Convex Problems", Proceedings of the 35th International Conference on Machine Learning, PMLR, vol. 80, 2018, pp. 560-569.

Byrne et al., "Taskmaster-1: Toward a Realistic and Diverse Dialog Dataset", Proceedings of the 2019 Conference on Empirical Methods in Natural Language Processing and 9th International Joint Conference on Natural Language Processing, Hong Kong, Nov. 3-7, 2019, pp. 4516-4525.

Chen et al., "Structured Dialogue Policy With Graph Neural Networks", Proceedings of the 27th International Conference on Computational Linguistics, Aug. 20-26, 2018, pp. 1257-1268.

Dryden et al., "Communication Quantization for Data-Parallel Training of Deep Neural Networks", 2016 2nd Workshop on Machine Learning in HPC Environments (MLHPC), IEEE, 2016, pp. 1-8.

Ham et al., "End-to-End Neural Pipeline for Goal-Oriented Dialogue Systems Using GPT-2", Proceedings of the 58th Annual Meeting of the Association for Computational Linguistics, ACL, Jul. 5-10, 2020, pp. 583-592.

Henderson et al., "Deep Neural Network Approach for the Dialog State Tracking Challenge", Proceedings of the SIGDIAL 2013 Conference, Aug. 2013, pp. 467-471.

Konečný et al., "Federated Learning: Strategies for Improving Communication Efficiency", NIPS Workshop on Private Multi-Party Machine Learning, Oct. 2016, 5 pages.

Lin et al., "Deep Gradient Compression: Reducing the Communication Bandwidth for Distributed Training", arXiv preprint, arXiv:1712.01887v3, 2017, 14 pages.

Lipton et al., "BBQ-Networks: Efficient Exploration in Deep Reinforcement Learning for Task-Oriented Dialogue Systems", Proceedings of the AAAI Conference on Artificial Intelligence, vol. 32, 2018, 9 pages.

Loshchilov et al., "Decoupled Weight Decay Regularization", International Conference on Learning Representations, 2019, 18 pages.

McMahan et al., "Communication-Efficient Learning of Deep Networks From Decentralized Data", Proceedings of the 20th International Conference on Artificial Intelligence and Statistics, PMLR, vol. 54, 2017, pp. 1273-1282.

Mesnil et al., "Investigation of Recurrent-Neural-Network Architectures and Learning Methods for Spoken Language Understanding", In Interspeech, Aug. 2013, pp. 3771-3775.

Mrkšić et al., "Multi-Domain Dialog State Tracking Using Recurrent Neural Networks", arXiv preprint, arXiv:1506.07190v1, 2015, 6 pages.

Narayanan et al., "Robust De-Anonymization of Large Sparse Datasets", 2008 IEEE Symposium on Security and Privacy (sp 2008), 2008, pp. 111-125.

Radford et al., "Improving Language Understanding by Generative Pre-training", 2018, 12 pages.

Radford et al., "Language Models are Unsupervised Multitask Learners", 2019, 24 pages.

Ravuri et al., "A Comparative Study of Recurrent Neural Network Models for Lexical Domain Classification", 2016 IEEE International Conference on Acoustics, Speech and Signal Processing (ICASSP), IEEE, 2016, pp. 6075-6079.

Sarikaya et al., "Application of deep belief networks for natural language understanding", IEEE/ACM Transactions on Audio, Speech, and Language Processing, vol. 22, No. 4, Apr. 2014, pp. 778-784.

Strom, N., "Scalable Distributed DNN Training Using Commodity GPU Cloud Computing", Sixteenth Annual Conference of the International Speech Communication Association, 2015, 5 pages.

Vaswani et al., "Attention is All You Need", 31st Conference on Neural Information Processing Systems (NIPS), vol. 30, 2017, 11 pages.

Wen et al., "Semantically Conditioned LSTM-based Natural Language Generation for Spoken Dialogue Systems", arXiv preprint, arXiv:1508.01745v2, 2015, 11 pages.

Wolf et al., "TransferTransfo: A Transfer Learning Approach for Neural Network Based Conversational Agents", arXiv preprint, arXiv:1901.08149v2, 2019, 6 pages.

Yang et al., "Federated Machine Learning: Concept and Applications", ACM Transactions on Intelligent Systems and Technology, vol. 10, No. 2, Jan. 2019, pp. 1-19.

Zhang et al., "Dialogpt : Large-Scale Generative Pre-Training for Conversational Response Generation", Proceedings of the 58th Annual Meeting of the Association for Computational Linguistics, ACL, 2020, pp. 270-278.

Sattler et al., "Robust and Communication-Efficient Federated Learning from Non-IID Data", IEEE Transactions on Neural Networks and Learning Systems, vol. 31, No. 9, Sep. 2020, pp. 3400-3413.

Huang et al., "Federated Learning for Spoken Language Understanding", Proceedings of the 28th International Conference on Computational Linguistics, Dec. 8-13, 2020, pp. 3467-3478.

Wu et al., "Alternating Recurrent Dialog Model with Large-scale Pre-trained Language Models", Proceedings of the 16th Conference of the European Chapter of the Association for Computational Linguistics, Apr. 19-23, 2021, pp. 1292-1301.

Budzianowski et al., "Hello, It's GPT-2—How Can I Help You? Towards the Use of Pretrained Language Models for Task-Oriented Dialogue Systems", Proceedings of the 3rd Workshop on Neural Generation and Translation (WNGT 2019), Nov. 4, 2019, pp. 15-22.

Qiao et al., "Communication-Efficient Federated Learning with Dual-Side Low-Rank Compression", arXiv preprint, arXiv:2104.12416v1, Apr. 26, 2021, 6 pages.

Klein et al., "Learning to Answer by Learning to Ask: Getting the Best of GPT-2 and BERT Worlds", arXiv preprint, arXiv:1911.02365v1, Nov. 6, 2019, 10 pages.

Chinese Office Action dated Aug. 15, 2025 for Chinese Patent Application No. 202210933609.9, 16 pages (with translation).

* cited by examiner

FIG. 9

```
A computing system, comprising a computing device, comprising a processor
configured to:receive, from a first initial learning model executing on the
computing device, first context information representative of a first context
that corresponds to sensitive information;
```
↓ 905

```
input the first context information to a second initial learning model executing
on the computing device
```
↓ 910

```
determine, using the second initial learning model, reply information
responsive to the sensitive information based on the first context information
```
↓ 915

```
determine, by using the second initial learning model, updated context
information based on the first context information and second context
information representative of a second context that corresponds to the reply
information
```
↓ 920

```
transmit the updated context information to the first initial learning model from
the second initial learning model
```
↓ 925

```
train the second initial learning model based on the reply information to result
in an updated second learning model
```
↓ 930

```
parameters corresponding to the updated second learning model are
combined with parameters from other models to result in an updated central
learning model
```
935

900

DIALOG AGENTS WITH TWO-SIDED MODELING

CROSS REFERENCE TO RELATED APPLICATION

This is a nonprovisional claiming priority under 35 U.S.C. § 119 of U.S. Provisional Patent Application No. 63/229,490, filed on Aug. 4, 2021, entitled "FedAssistant: Dialog agents with two-sided modeling", the entirety of which prior application is hereby incorporated by reference herein.

BACKGROUND

Dialogue systems play an important role in daily life and are widely used for recommendation, question answering, online customer services, and companion chatbots. Two types of machine learning based dialogue systems typically comprise 1) utterance retrieval models that select responses from a given database and 2) neural generative language models that improvise responses. High-capacity generative language models trained on large datasets can perform well on dialogue generation related tasks. Use of large pre-trained language models, for example generative pre-trained transformer ("GPT") models (e.g., GPT, GPT-2, or GPT-3) result in good performance with task-oriented dialogue tasks and with open domain chit-chat chatbots. Various sources of publicly available datasets may be used for training large pre-trained models.

However, for private datasets that are held by individual companies, institutes, organizations, and the like, privacy concerns may prohibit current language models from maximizing their usefulness. For example, a nation's laws may forbid sharing of a person's or an organization's personal or private data, which may be referred to as sensitive data, without consent. Moreover, even when sensitive data is 'deidentified', or anonymized, before sharing, the identity of a source of the sensitive data (e.g., a person or an organization to which the sensitive data pertains) may be determined through data re-identification with auxiliary data. Therefore, owners of sensitive data, such as medical records, often are not willing to share their raw data directly.

On the other hand, data holders may be service providers that have an incentive to share sensitive data of their users, subscribers, customers, etc. to improve the rendering of services to the users, subscribers, customers, etc. For example, question answering models are able to answer more comprehensive and complicated questions after training on data from multiple knowledge domains. Accordingly, a method for training language models with data from multiple data owners, without revealing the raw data associated with the owners, is desirable.

Federated machine learning may be used in training of machine learning models to preserve privacy. A federated machine learning framework may utilize a central learning model process, located at a central server, such as a FedAvg Algorithm, which may use a weighted or unweighted average of clients' model parameters or gradients to update a global/main/central model and then the global model sends the update back to its corresponding clients. However, such conventional federated machine learning may be problematic for several reasons. For example, large models typically consist of more than one hundred million model parameters and updating client and global models iteratively is impractical due to huge communication costs between the central model and user/client models, especially when communication between the central model server and client/user devices is at least partially facilitated by a wireless communication network. Another problem is that the generative property of dialogue neural models can also be a constraint for service users: to produce a response with given context, generative models improvise word by word, which is time-consuming and processor resource intensive for mobile users with limited computational resources. Another problem that may arise with conventional federated learning is that deploying dialogue neural models from client devices to service providers' servers may avoid the consuming limited computational resources at a user's device but typically requires the transfer of users' raw utterances to the central model server. Transmitting users' raw utterances may compromise users' privacy since private information can be mined from the utterances by nefarious actors that may acquire the users' sensitive, raw utterance data without authorization.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

A framework comprising an assistant learning model, which may be referred to as a FedAssistant model, is used to train a neural dialog system in a federated learning setting. The dialog system may then be used to facilitate a chatbot that may serve multiple purposes. The assistant learning model may be trained on data from multiple data owners, or data holders, without raw data leakage during training and evaluating of the assistant model or user learning models. The assistant model training may comprise two-side modeling that may be easily deployed to a user that the data owners/providers support. To reduce communication costs between data holders and a parameter server, which may be referred to as a central server and which may comprise access to a central model, the assistant model may implement sparsification, for example Top-k gradient sparsification. It will be appreciated that the central model may be distributed across different computing systems, which may be collocated or which may be separated geographically.

The two-sided dialogue modeling framework may be based on use of GPT models (currently, GPT, GPT-2, and GPT-3 exist and may be used). Models other than GPT may be used instead. Only hidden states, which may comprise context information, are transferred between a user model and an assistant model. FedAvg may be performed on parameters corresponding to only the assistant model after the assistant model has been trained. The assistant model may use the transformer architecture of a GPT model to model next utterances and previous hidden states of the user model can be regarded, or referred to, as contexts.

By using the FedAssistant assistant model framework as described herein, raw data transmission during training and inference states is avoided. Only past keys and values of all transformer blocks of a user model or an assistant model are transmitted as contexts for response generation during training and inference. The supplied plain-text raw data is visible only to the data owners/holders. During training, each data holder may initialize a first, user-side model and a second, assistant-side model. Only parameters, values, factors, coefficients, and the like, from the assistant-side model are provided to the parameter server via a FedAvg algorithm to update a model at the parameter server. The model in the parameter server may be referred to as a central model and may be operated, or otherwise facilitated, by a third-party service provider and may be accessible by all data holders and all actual users. After training, the model at the parameter server replaces assistant-side models for each data holder and becomes the assistant model used to answer queries. The user-side models are distributed to actual users according to data holders' preferences, specifications, permissions, requirements, or other operational needs.

In an embodiment, data holders may be viewed as, or referred to as, user service providers (e.g., banks, medical services providers, financial services providers, social media platforms, retailers, and the like). The FedAssistant assistant model framework facilitates simple model deployment to data holders' users; users may not have to generate responses locally with associated user devices.

Using the FedAssistant assistant model framework can improve the services of dataholders so that they are willing to participate in federated learning while protecting their private raw data. For example, a healthcare services provide may be much more willing to participate in the training of assistant models, and ultimately a central model, because its raw data corresponding to its patients, for example, is not revealed to the assistant model or to the central model.

An example embodiment method comprises receiving, from a first initial learning model executing on a computing device comprising a processor, first context information representative of a first context that corresponds to sensitive information; inputting the first context information to a second initial learning model executing on the computing device; and determining, using the second initial learning model, reply information responsive to the sensitive information based on the first context information.

In an embodiment, the training method comprises determining, by using the second initial learning model, updated context information based on the first context information and second context information representative of a second context that corresponds to the reply information; and transmitting the updated context information to the first initial learning model from the second initial learning model.

The first and second initial learning models may comprise, for example, a user-side model and an assistant-side model, respectively, of a two-side model training model that are running on different computing system in a distributed server-client computing environment, and may comprise the same parameters as a central model (i.e., the first and second initial learning models may be the same model with the same parameters as an initial central model). In an embodiment, the first and second initial learning models may run on the same computing system. The computing device may be part of a computing system owned, operated, leased, or controlled by an entity that owns a corpus of dialog conversations that comprise the sensitive information that the owner of the data wishes to keep private. One or more conversations of the corpus may include dialog messages between a user and an agent, which may be, or may have been, a real person or a chat agent. The dialog conversations may include query message initiated, or sent, by a user to an agent and the dialog conversations may also include response message that the agent generated and sent to a user device of the user in response to one or more queries. The corpus of dialog conversation messages may comprise messages that occurred and were recorded/stored to the corpus before the embodiment method is performed using two side-modeling. Contexts may be generated, or determined, by the user-side model and the assistant-side model based on the dialog messages of the corpus. A context may comprise keys or values generated by the models for a given query message or response message. For example, a user-side model may generate a context for a query message and send the context to the assistant side model without sending actual language of the query message retrieved from the corpus. The assistant-side model may then generate a context based on the response message of the corpus that was sent by the agent (real person or automated) in response to the query message. The assistant-side model may combine the context received from the user-side model with the context it generated based on the response message that corresponds to the query message in the corpus to result in the second context, and then send the second context the user-side model without sending actual language of the response message.

In an embodiment the method may further comprise training, by the computing device, the second initial learning model based on the reply information to result in an updated second learning model. In an embodiment, the sensitive information from the corpus input to, provided to, or otherwise obtained by the first initial learning model is not used to train the second initial learning model that results in the updated second learning model. In an embodiment the second initial learning model does not receive the sensitive information from the first initial learning model, or from any other source.

In an embodiment, the first initial learning model and the second initial learning model may comprise a pre-trained language model, which a central model may also comprise. In an embodiment the pretrained language model may comprise a generative pre-trained transformer model, such as a GPT, GPT-2, GPT-3, or similar.

In another embodiment the method may further comprise training, by a second computing device, a central learning model according to a federated learning model to result in an updated central model based on different reply information that was generated responsive to different contexts, which correspond to different conversation dialogs between different user learning models and different assistant learning models, received from the different assistant learning models. In other words, different owners of different respective data sets/corpuses of dialog conversation message may have their own respected updated second learning models that each have respective parameters, or gradients, that are distinct from others of the updated second learning models. Parameters of the different updated second learning models may be provided to the second computing device, which may include a processor and which may be configured to operate a parameter server, and which may perform a federated learning model based parameters from the different updated second learning models to result in an updated central learning model.

The embodiment method may further comprise determining, with a central computing device of a central computing system comprising a processor, a response to a query received from a user device that is configured to present a dialog agent application interface of the user device; and transmitting, with the central computing system, the response to the dialog agent application interface of the user device; wherein the central computing device uses the updated central model to determine the response to the query. The central computing device of the central computing system may comprise an updated central model that was updated during training of multiple assistant-side models using two-sided modeling that does not transmit sensitive information from one model to another during training. The central computing device may be owned, operated, leased, controlled, or otherwise deployed by a data holder that owned a corpus that was used to train at least one of the assistant-side models.

An embodiment method may further comprise determining a response to a query input to a dialog agent of a user device that comprises a processor and that is configured to present a dialog agent application interface of the user device wherein the user device uses the updated central model to determine the response to the query. In this scenario, instead of a central computing device providing an assistant agent that comprises a trained central model to respond to a user's real time query, the central model may be deployed on a user's device, such as a smart phone, tablet, or laptop computing device.

In an example embodiment, a computing system comprises a computing device comprising a processor configured to: receive, from a first initial learning model executing on the computing device, first context information representative of a first context that corresponds to sensitive information; inputting the first context information to a second initial learning model executing on the computing device; and determining, using the second initial learning model, reply information responsive to the sensitive information based on the first context information.

In an embodiment the processor of the computing device may be further configured to determine, by using the second initial learning model, updated context information based on the first context information and second context information representative of a second context that corresponds to the reply information; and transmit the updated context information to the first initial learning model from the second initial learning model.

In an embodiment, the processor may be further configured to train the second initial learning model based on the reply information to result in an updated second learning model. The sensitive information input to the initial learning model may not be used in the training of the learning model that results in the updated second learning model.

In an embodiment, the first initial training model and the second initial training model comprise a pre-trained central language model.

In an embodiment, parameters corresponding to the updated second learning model may be combined with parameters from other models to result in an updated central learning model.

In an example embodiment, a non-transitory machine-readable medium, may comprise executable instructions that, when executed by a processor of a computing device that comprises access to a first initial learning model and to a second initial learning model, facilitate performance of operations, comprising input first sensitive information to the first initial learning model; determine, with the first initial learning model, first context information that corresponds to the first sensitive information; transmit the first context information to the second initial learning model; determine, with the second initial learning model, reply language information responsive to the first context information, and first updated context information based on the first context information and based on second context information that corresponds to the reply language information; transmit the first updated context information to the first initial learning model; input second sensitive information responsive to the first updated context information to the first initial learning model; determine, with the first initial learning model, third context information that corresponds to the second sensitive information and the first updated context information; determine second updated context information based on the first updated context information and the third context information; and transmit the second updated context information to the second initial learning model.

In an embodiment, the executable instructions further facilitate operations, comprising: train the second initial learning model based on the first context information, the second context information, and the third context information to result in an updated second learning model.

In an embodiment the executable instructions may be configured not to train the second initial learning model on the first sensitive information or on the second sensitive information. In another embodiment, the executable instructions may be configured not to train the second initial learning model on the first sensitive information but to train the second learning model on the second sensitive information.

In an embodiment, the executable instructions are configured to provide the updated second learning model to a parameter server to be used for training a central learning model to result in an updated central model.

BRIEF DESCRIPTION OF THE DRAWINGS

FIG. 9 illustrates a block diagram of a system embodiment.

DETAILED DESCRIPTION OF THE DRAWINGS

Figure 1:
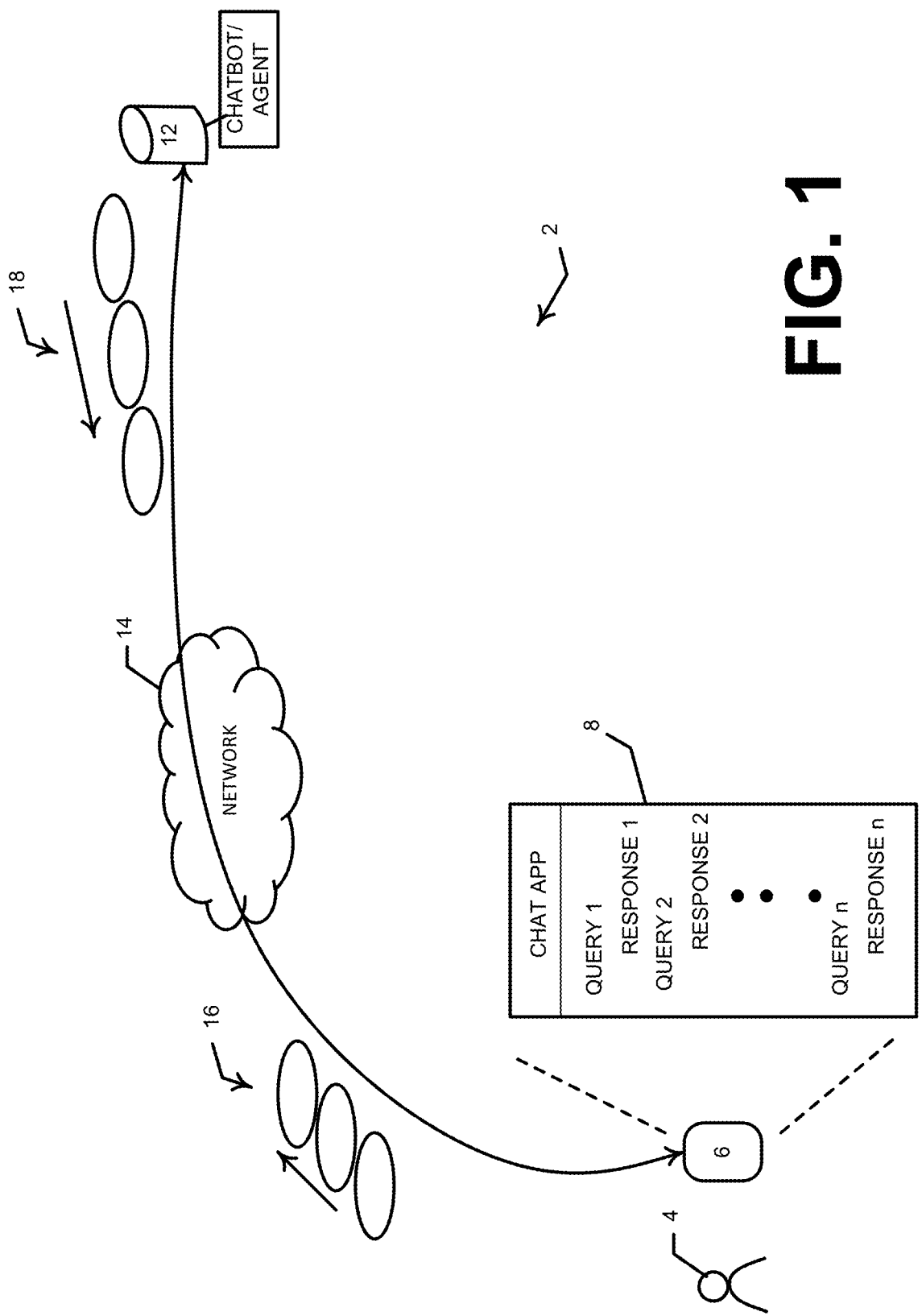
FIG. 1 illustrates a chatbot system in a network environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

A two-side modeling framework may use Generative Pre-trained Transformer ("GPT") models, such as GPT, GPT-2, GPT-3, or similar, to train a central language model based on data sets that may be distributed among a plurality of computing devices, storage devices, and the like, without revealing utterances from any of the distributed computing devices, storage devices, and the like. In an embodiment, the data sets may be distributed among different computing systems and the central model may be distributed among different computing systems, which may be located at different data centers or other locations. The computing systems among which the data sets are distributed may be the same, or different, computing systems among which the central model is distributed. A data owner/holder ("D") may initialize two GPT models, which may be classified as a user side GPT model and an assistant side GPT model. For a conversation ("C") corresponding to a data holder D, the user side GPT model only models a user's utterances locally while the assistant side GPT models utterances generated by the assistant side and generates replies based on previous contexts received from the user side GPT model or the assistant side GPT model. The central model may be trained according to a federated model by assistant side models corresponding to data holders. The central model may be used to generate replies to queries received from users after the central model has been trained. The central model may comprise the same model as the user side GPT model and the assistant side model before training. For purposes of discussion, the user side GPT model may be referred to as a user model and the assistant side GPT model may be referred to as an assistant model. The central model and an assistant model may be executed on the same computing device or on different computing device. It will be appreciated that as the user model and the assistant model are refined as they are trained, the user model may be referred to as an updated user model and the assistant model may be referred to as an update assistant model. A data holder D may comprise a user GPT model that has been trained, or are soon to be trained, using conversation data that corresponds to one of a plurality of broad topics, such as: repair, coffee, movie, automobile, phone, etc. A data holder D may comprise an assistant GPT model that has been trained, or is soon to be trained, using conversation data that corresponds to one of a plurality of broad topics, such as: repair, coffee, movie, automobile, phone, etc.

Turning now to the figures, FIG. 1 illustrates system 2 that facilitates user 4 using user device 6, which may be a mobile device, a tablet, a laptop, etc., to provide an interface of a chat application 8 to communicate with a chat bot application 10, which may be running on a network computing system 12, which system may comprise a server, via communication network 14. When deployed for service to support, or respond to, user device messages, chat bot application 10 may provide automatic reply messages in response to users' queries or other messages; the chat bot application may comprise a trained central model that has been trained based on information or data corresponding to data holder sensitive information. The trained central model may comprise a parameter server (or the parameter server may comprise the trained central model) and the trained central model may be trained according to a federated process, such as, for example, FedAverage. (FedAverage may comprise a known process used to training a central model based in part on messages generated at multiple models remote from the central model being rained.) In an embodiment, the central model of chat bot application 10 may be trained using context data transmitted from a user device 6. In another embodiment, the central model may be based on conversation data that has been archived, wherein the archived conversation data comprises prior (e.g., before the central model is trained) queries and responses that may have been generated during conversations between user devices and other chat applications, such as, for example, an enterprise's internal help desk chat application that may have been operated according to a trained language model or by a human being. In an embodiment, a user device 6 may transmit query contexts 16 corresponding to query messages comprising utterances (e.g., language information entered textually or verbally by a user) made by user 4 to an assistant model and the assistant model may communicate reply contexts 18 to the user device. In another embodiment, query contexts may be generated based on sensitive information in a corpus of messages of prior dialog conversations that is stored or maintained by a data holder. In an embodiment, instead of being transmitted by user device 6, query contexts 16 may be generated during training using a two-model modeling-technique by a user-side model and transmitted thereby to an assistant-side model; instead of being transmitted by computing device 12, response contexts 18 may be generated during training using a two-model modeling technique by an assistant-side model and transmitted thereby to a user side model.

Communication network 14 may comprise a public network, such as, for example, the Internet. Communication network 14 may comprise a semi-private network, such as an intranet that provides communication services to an authorized set of users, such as, for example, employees of an enterprise. Communication network may comprise a network that facilitates communication between machine devices, such as for example, a Controller Access Network ("CAN") that connects computing modules and devices of a vehicle, such as an automobile. In an embodiment, machine data generated from a vehicle may be sensitive information that is used to train a central model that will be used for autonomous driving applications.

Chat application 8 may provide an interface for user 4 to enter messages, or queries, such as textual messages, that may comprise one or more questions to which an answer is desired from system 12, which may comprise or have access to a chat agent application. Chat application 8 may provide an interface for user 4 to view messages, or responses that are replies to questions posed by chat agent application 10.

Messages entered by user 4 into chat application 8 may be entered via one or more types of interfaces, including a key-pad, a key board (hardware or virtually provided as part of a display interface), a microphone that captures utterances by user 4, drop down boxes, text boxes, a list of determined messages, and the like.

Figure 2:
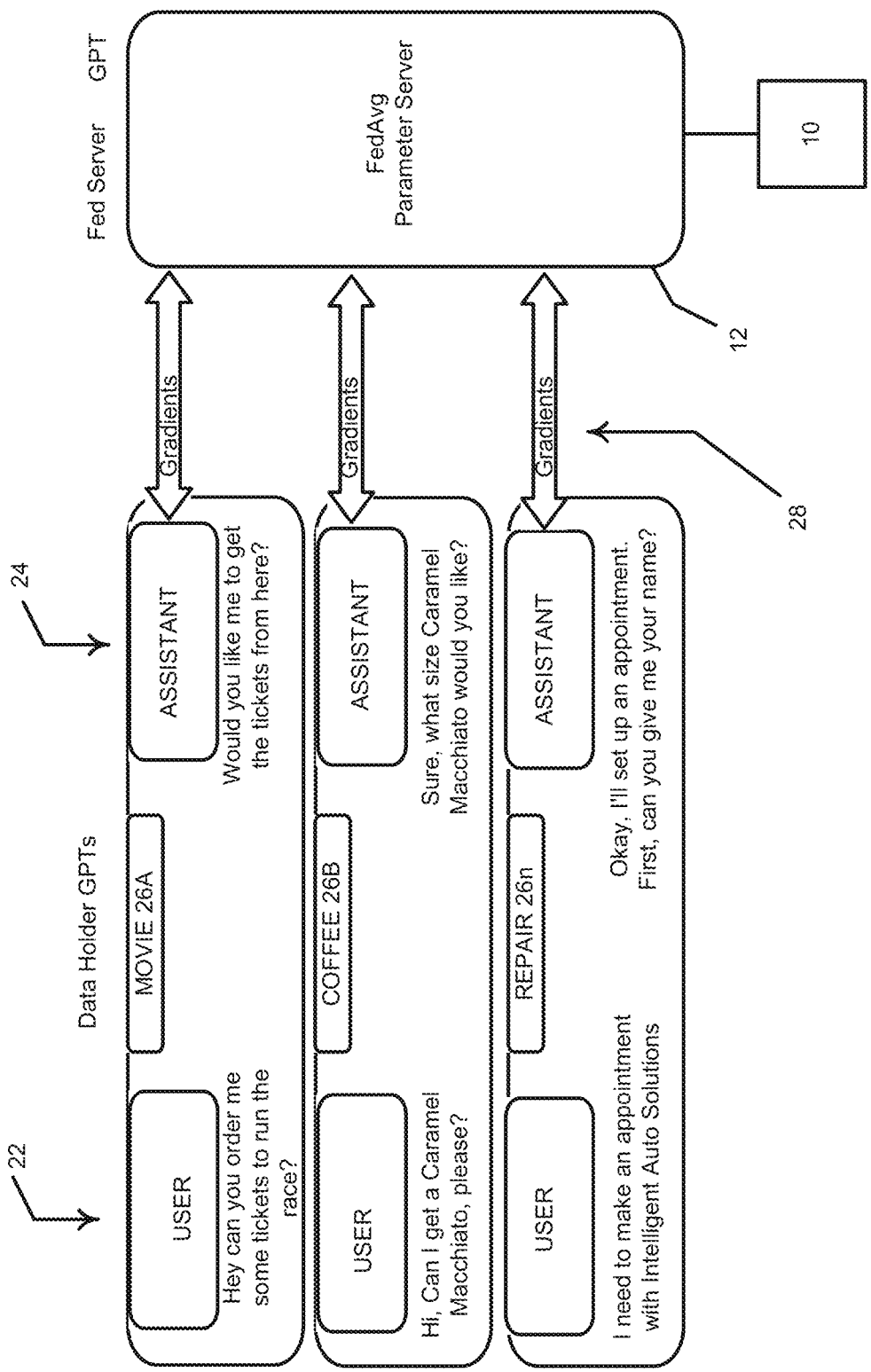
FIG. 2 illustrates an embodiment system to train a chat agent model using two-sided modeling.

Turning now to FIG. 2, the figure illustrates a system 20 to train a chat agent using a two-model modeling technique by training user models 22A-22n and corresponding assistant models 24A-24n that correspond to data holders 26A-n. Data holder 26A is shown as relating to the broad topic 'Movie;' data holder 26B is shown as relating to the broad topic 'Coffee;' and data holder 26n is shown as relating to the broad topic 'Repair.' Contexts 16 and 18 may pass back and forth between user models 22A-n and corresponding assistant models 24A-n during a training process. Trained assistant models 26 may be used to update a central model of parameter server 12 to result in an updated central model such that the updated central model comprises updated parameters/gradients that are based on the contexts 16 and 18 generated or determined during the training process. The updated central model may be used for generating reply messages in response to users' queries and messages by chat bot application 10 when the chat bot application is deployed for providing responses to live users' queries in real-time. A set of conversation data, stored and owned by a data holder 26, which may be referred to as a dataset or corpus of conversation data and which may comprise query and reply messages, may be used to train the user model and the assistant model In FIG. 2, the three data holders Movie, Coffee, Repair each 'own' the conversation between users and assistants that correspond to them. A data holder may use two models (e.g., two GPT-2 models) for modeling users' and assistants' utterances separately. In an embodiment, a FedAvg process is only performed for assistants' model parameters/gradients. As a result, data holders can better obtain their own auto-response assistants to further improve their services and users are able to obtain replies without sending raw utterances through one simple round of user side GPT-2 inference.

A FedAvg process may typically combine local Stochastic gradient descent techniques ("SGD") for a client/user-side model and averaging of parameters on a server. In a conventional federated learning implementation, each of multiple clients downloads an entire model and then uploads an updated model after training. The communication cost of this process are typically high, but may be addressed by one or more techniques. For example, gradient compression in a distributed SGD environment may be used.

Quantized SGD aims to trade-off the communication cost and convergence guarantees. The sparsification method maintains the unbiasedness of sparsified stochastic gradient by dropping some coordinates of the gradient and amplify the remaining ones. Another technique may be biased gradient compression that includes signSGD and data gravitation-based classification ("DGC") sparsification. SignSGD utilizes the sign of a stochastic gradient to perform a 1-bit compressed communication between server and clients. A common use for gradient sparsification is to reduce the size of transmitted gradients from a client model to a server model. Gradient sparsification may include sending gradients or absolute values of gradients that are larger than a threshold or sending a fixed portion of gradients. Different from previous sparsification methods, DGC sparsification sends the magnitude of gradients greater than a threshold while continuing to accumulate local gradients as a local/client model that may be running on a client device.

To simplify the communication process in the training of task-oriented dialog agents as described herein a sparsification technique of sending a fixed portion of gradients may be used, for example an assistant model and a parameter server communicating a fixed proportion of gradients selected according to magnitude.

Task-oriented dialog agents/assistants are becoming more and common in providing real-time assistance to users. Examples of dialog assistants include: Google Home, Apple Siri, and Microsoft Cortana. Typically, a task-oriented dialog agent is composed of four parts: a natural language understanding ("NLU") module/function, a dialog state tracking ("DST") module/function, a dialog policy module/function, and a natural language generation ("NLG") module/function. Dialog agents often have specific tasks to complete and may be domain-dependent. (The term 'domain' may refer to a topic of a conversation during a chat session, for example, how to diagnose and correct a computer malfunction.) An NLU module, or function, facilitates a pre-processing step for later parts, or functions. The NLU module takes human utterance as input and typically recognizes the following three tasks: domain detection, intent determination, and semantic slot tagging. The DST module is a slot-filling process where a dialog state is represented by a combination of several attribute slots and values. Deep neural networks and recurrent networks may be applied to model the process. The dialog policy module may use the dialog state as input and determine a policy for selecting a dialog act. Reinforcement learning algorithms are often used for policy optimization. The dialog state may be encoded as a feature vector of a Deep-Q Network ("DQN"). The DQN then outputs a real-valued vector whose entries represent the choice of possible dialog acts. NLG may perform transforming a dialog act to natural language, which may incorporate a template-based determination.

As described herein, an end-to-end neural system may incorporate a large-scale pre-trained language model to build a chit-chat dialog system using features and attributes of a GPT model, such as a GPT-2 model, that trains a chat agent, or chat-bot according to a federated process but without transferring raw utterances from a client/user device model, or without transferring utterances that are contained in a corpus of training data, to a model that facilitates the chat agent in responding to queries form users.

A set of data holders may be defined as $D=\{D_1, D_2, \ldots, D_N\}$ where N is a total number of data holders. Each data holder $D_i$ 'owns', or is associated with, a dataset of conversations $C_i=\{c_i^1, c_i^2, \ldots, c_i^{n_i}\}$ where $n_i$ refers to the size of a dataset associated with a given $D_i$. Each conversation C consists of a sequence of utterances between its users and assistants that are input to corresponding user models and assistant models, respectively. The utterances are used to train the local user models and assistant models, respectively, and the assistant models are then used to train a central model, which central model may facilitate the operating of an online chat bot, or chat agent with a determined level of accuracy corresponding to a data holder $D_i$, such as, for example, a medical services provider, a financial services, provider, a repair advice provider, a retail seller, and the like.

A two-side modeling framework, which may be based on GPT-2 models, facilitates the training of the chat agent without revealing utterances provided to a user-side model to an assistant-side model or without revealing utterances from provided to an assistant-side model to a user-side model. A data holder $D_i$ may initialize two GPT-2 models, classified as user side GPT-2 and assistant side GPT-2. For any $j^{th}$ conversation $c_i^j D_i$, the user-side GPT-2 models only the user utterances while the assistant side GPT-2 is responsible for modeling assistant utterances or generating replies based on the previous context. It will be appreciated that the utterances may not be real time utterances during training and instead may be parts of conversations that were previously conducted and stored and that perhaps represent conversation messages between a live agent and a real person/user.

Conventionally, to train a model, such as a GPT-2 model, with multi-round utterances, all previous utterances are concatenated together separated by <eos> tokens as context for training current utterances with language modeling ("LM") models. Based on a current utterance $U=\{w_0, w_1, \ldots, w_{|U|-1}\}$ and a previous context c, an objective of a LM model is to maximize the likelihood over every word token of U:

$$L(U)=\Sigma_{i=1}^{|U|}\log(P(w_i|c,w_0,w_1,\ldots,w_{i-1})) \quad \text{Eq. 1}$$

Maximizing likelihood L(U) may be accomplished by minimizing the cross-entropy loss between a generated probabilistic distribution and a ground truth utterance $U_{1:|U|-1}+\{<eos>\}$ using a one-shot process. Besides LM, a GPT-2 model may consist of layers of transformer decoder blocks that at a current position can only query (Q) keys (K) and values (V) of previous positions by masking future keys and values, which can be formulated as:

$$\text{Attention }(Q, K, V) = \text{Softmax}\left(\frac{\text{Mask }(QK^T)}{\sqrt{d_k}}\right)V \quad \text{Eq. 2}$$

Figure 3:
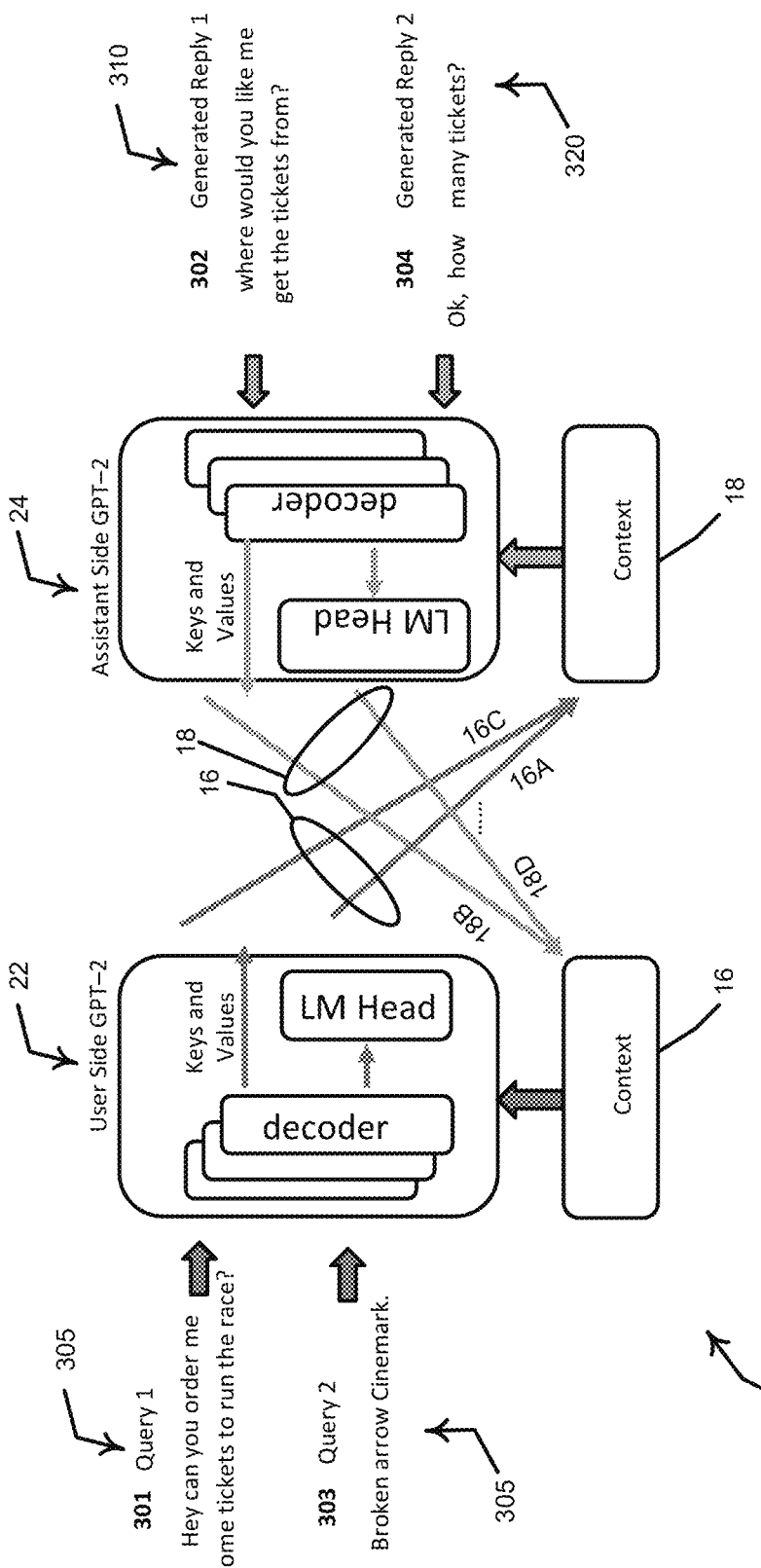
FIG. 3 illustrates an embodiment method to train a chat agent model using two-sided modeling.

The FedAssistant model, or assistant-side model, as described herein, may apply conventional approaches for training both the user-side and assistant-side GPT model, but avoid transmission of raw utterances between the user-side and the assistant-side GPT models by exploiting past keys and values of transformer blocks of the GPT model, as shown and described herein in reference to FIG. 3. Benefits of the two-sided modeling as described herein are facilitated by and predicated on previous keys and values being sufficient as context for modeling a current utterance; future keys and values are typically masked for transformer decoder blocks. Thus, instead of forwarding a current utterance (current insofar as a current message being processed but that may have been previously stored in a corpus of conversation utterances) of either the user-side model to the assistant-side model or from the assistant side model to the user-side model, only the keys and values that are based on and that correspond to the utterance, which keys and values may be referred to herein as a context associated with the utterance, are forwarded from one model side to the other. For example, to model a third utterance, keys and values of all word tokens of first and second utterances are used. This facilitates the assistant-side model, or FedAssistant model, to train itself using past keys and values without needing the raw data of the third utterance. Moreover, speed of training and generating inferences of the GPT model are increased because the model does not need to compute values for the context and all previous keys.

To train both GPT-2 models (user and assistant), in the beginning a user side GPT-2 models its first utterances $U_0$ (from corpus data) and sends corresponding computed keys and values to the assistant side as context c. Then assistant-side GPT-2 models the response $U_1$ based on context c and transmits keys and values of both $U_0$ and $U_1$ to the user side as updated context c, which may be referred to herein as a second context. This process continues repeatedly until all utterances are fed to the models and each model updates its own parameters through language modeling. If the assistant side starts the conversation, then the client side models $U_0$ and the training procedure is similar. Unlike previous works that update GPT-2 by all utterances, FedAssistant requires the user side to train its model based only on user utterances from a training corpus while the assistant side only updates its parameters for assistant utterances from the training corpus. After training, the user side GPT-2 can be distributed to other users while its data holder holds the assistant-side model.

The two-side modeling technique described herein provides several advantages. The novel technique requires no transmission of raw data between the user side model and the assistant side model, so information contained in sensitive conversations, and other sensitive data, are kept private (i.e., the data holder that owns the sensitive data that is used to train the assistant side model does not expose the sensitive data to a third party). In addition, unlike other chatbot, or chat agent training implementations, user devices with limited resources may not have to generate responses word by word locally; generation of responses may be performed by the assistant side model. Furthermore, service providers (e.g., data holders) have control over the generated responses.

In an aspect, in addition to the advantages mentioned above, generation performance of the assistant side model, or FedAssistant model, may be enhanced by performing a FedAvg algorithm for assistant side models in conjunction with a parameter server. Before training, data holders may initialize their corresponding user-side and assistant-side models with the same parameters (e.g., the user and assistant models may be pre-trained from a large corpus of conversation data owned by the data holder). After training user and assistant models using a corpus of data owned by a data holder that may comprise a batch of conversation data, a data holder may send an updated version (i.e., a trained version) of the assistant-side model to the parameter server, which may average updates (e.g., parameters/gradients) from several assistant-side models from one or more data holders to result in updated server parameters. The updated server parameters may then be sent back to clients (e.g., user models) for a new, or next, round of training of user models and assistant models for one or more data holders. Iterations of such training may continue until certain epochs are reached, or until certain other criteria are satisfied.

Performing FedAvg for GPT models could cause high communication costs due to having to transmit from an assistant model to a parameter server the large number of trainable parameters of a GPT model (e.g., hundreds of millions for a GPT-2 model). If all parameters are to be used by FedAvg, for each round of FedAvg, the parameter server might need to download previous weights and upload averaged new weights for all data holders. Thus, the parameter server bandwidth could become a bottleneck for pure federated learning by the parameter server using parameters from FedAssistant assistant-side models.

In an embodiment, to reduce communication cost for transmission of parameters, FedAssistant assistant models may use compression, such as sparsification, for example Top-k gradient sparsification. In an embodiment, for every data holder and parameter server, Top-k gradient sparsification may select k largest magnitude gradients and thus only k of the gradients from several assistant-side models are transmitted and used for FedAvg. Top-k gradients may be selected on the client side (in this case, the FedAssistant assistant-side model) for uploading to the parameter server and top-k gradients may be selected on the server side after averaging local gradients for downloading to clients.

Turning now to FIG. 3, the figure illustrates a method 300 to train an assistant model and a user model. At step 301, user model 22 receives a query message 305 from a dataset corpus that corresponds to a message from a user device. User model 22 determines keys and values corresponding to query 301 and combines the keys and values into a first context 16A. At step 302, assistant model 24 generates a response message 310 based on first context 16A and generates keys and values corresponding to message 310 that are combined into a second context 18B as a reply context. Second context 18B may comprise first context 16A and keys and values corresponding to message 310. At step 303, user model 22 models a next query message 315 based on second context 18B and generates keys and values corresponding to message 315 that are combined into a third context 16C as a query context. Third context 16C may comprise first context 16A. second context 18B, and keys and values corresponding to message 315. At step 302, assistant model 24 may model a response message 320 based on third context 16C and generate keys and values corresponding to message 320 that are combined into a fourth context 18D as a reply context. Fourth context 18D may comprise first context 16A, second context 18B, third context 16C, and keys and values corresponding to message 320. Query messages 305 and 315 (which may be in the form of questions or responses) or reply messages 310 and 320 (which may pose questions or may provide responses to questions posed in query messages) are not transmitted from a user model to an assistant model, or from an assistant model to a user model, respectively. Query messages or response messages from the training corpus may be referred to as utterances.

For a given data holder, the user-side model and the assistant side-model model utterances of users and assistants, respectively. Keys and values of transformer decoder blocks of the models are transmitted as context and may be used for determining a next utterance. Therefore, no raw text is passed between the user-side model and the assistant-side model.

Algorithm 1 shows an example of an algorithm that may be used to perform federated learning with Topk sparsification for FedAssistant.

Algorithm 1

Input: clients $C_1, ..., C_N$
Input: round b for local training
Input: the number of clients N
Input: optimization function SGD
Input: training steps m
Input: init parameters w = {w[0],w[1],...,w[N −1]}
    1  $G^0 \leftarrow 0$;
    2  for i =1 to m do|
    3  | $G_k^t \leftarrow G_k^{t-1}$;
    4  | for i =1 to b do
    5  | | Sample dialoa data from clientk;
    6  | | $G_k^t \leftarrow G_k^t + 1/N_b \nabla f(x; w_t)$;
    7  | end
    8  | for i =1 to N do
    9  | | $\hat{G}_k^t[i] \leftarrow topk(G_k^t[i])$;
   10  | end
   11  | All-reduce$G_k^t$ : $G^t \leftarrow 1/N\, P_{k=1}^N\, encoder(\hat{G}_k^t)$;
   12  | $G^t \leftarrow topk(G^t)$;

-continued

Algorithm 1

13 | $w_{t+1} \leftarrow$ SGD $(w_t, G^t)$;
14 end

Figure 4:
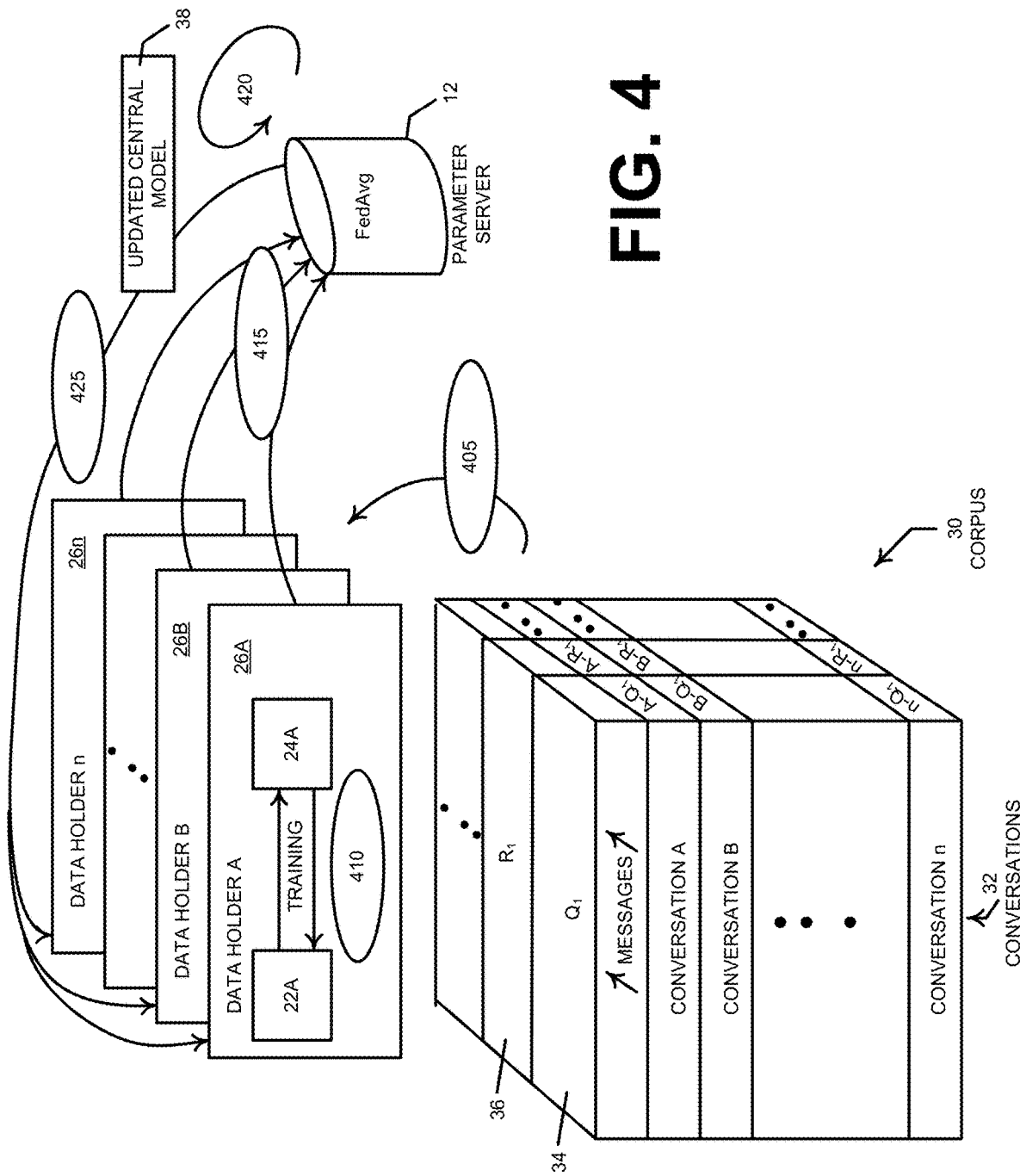
FIG. 4 illustrates an embodiment system and method of training a chat agent model using two-sided modeling with parameters from multiple data holders.

Turning now to FIG. 4, the figure illustrates an embodiment method 400 that may be used to train a central model at a parameter server 12, or at another computing device, using a two-sided modeling technique. Data used to train user-side models 22A-22n and assistant-side models 24A-24n may be part of data set corpus 30, which may comprise sensitive data that the owner of the data wishes to keep private vis-à-vis other data owners and other entities or individuals. Multiple data holders 26A-26n are shown in the figure but only one data set 30, or corpus of sensitive data, is shown for clarity; it will be appreciated that a data holder likely would not permit another data holder to access its corpus of sensitive data and that each data holder 26A-26n would have its own dataset corpus for training user and assistant models based on its corresponding dataset, or datasets.

Corpus 30 is shown with multiple conversations 32A-32n. For each conversation 32 corpus 30 may comprise multiple query messages 34 and multiple response messages 26, wherein the response messages may correspond to respective query messages.

At step 405 data from corpus, or corpuses, 30, are sent to user models and assistant models corresponding to respective data owners 26A-26n. As discussed above, although only one data set 30 is shown, if data owners 26A-26n are distinct (e.g., separate entities, such as, for example, a bank, a medical services provider, an online retailer, etc.) there would typically be respective distinct data sets. As shown in the figure, user model 22A and assistant model 24A have been deployed to data owner 26A for training step 410 to be conducted by data owner 26A. Thus, there is not a privacy concern with sharing sensitive data to both the user model 22A and the assistant model 24A because both models are being executed at step 410 by the owner of the sensitive data, preferably within a computing system that is not accessible to anyone other than a user authorized by the given data holder. At step 410 user model 22A and assistant model 24A may be trained as described elsewhere herein by the user model determining query contexts corresponding to user query messages 34 stored in corpus 30 and sending the query contexts to the assistant model and by the user model 24A determining reply contexts corresponding to response messages 36 that correspond to the query messages and sending the reply contexts to the user model.

When messages 34 and 36 and corresponding contexts have been processed by user model 22A and assistant model 24A such that initial parameters of the user model and the assistant model have been updated according to the training at step 410, the updated parameters may be forwarded to the central model at the parameter server 12 at step 415. Parameter server 12 may receive multiple updated parameters from data owners 26A-26n. In an embodiment, only the assistant model(s) 24A-24n may forward updated parameters to the central model at sever 12. In another embodiment both user model(s) 22A-22n and assistant models may forward their corresponding updated parameters to parameter server 12.

At step 420, parameter server 12 may perform a FedAvg algorithm on the updated parameters received from user models 22A-22n or updated parameters received from assistant models 24A-24n. The result of performing a FedAvg algorithm, or process, on the updated parameters received from user models 22A-22n or updated parameters received from assistant models 24A-24n is that an updated central model may be created. At step 425 updated central model 38 may be forwarded to data holders 26A-26n and models 22A-22n and 24A-22n may be retrained with data from corpus 30, but now beginning with updated parameters received in updated central model 38 instead of initial parameters that were initially part of user models 22A-22n and assistant models 24A-24n. Steps 405-425 may be repeated a determined number of times to achieve a desired level of retraining/refinement of user models 22A-22n or assistant model 24A-24n. In an embodiment, a FedAvg algorithm/process is only performed on parameters of one or more assistant models without performing FedAvg on parameters of user models 22A-22n. Thus, the central model may be updated based only on assistant side model parameters.

Figure 5A:
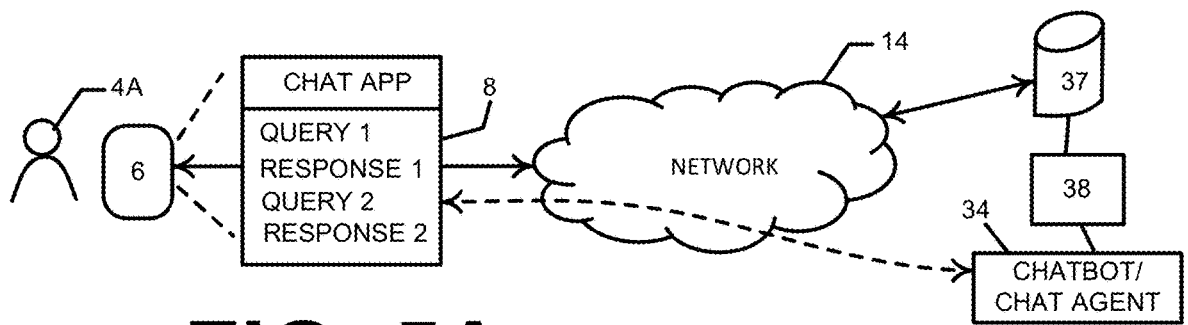
FIG. 5A illustrates an embodiment system using, over a network, a chat agent model trained using two-sided modeling.

Turning now to FIG. 5A, the figure illustrates an embodiment where a user 4A using a user chat assistant application 8 running on a user device 6 accesses a chatbot/chat assistant/chat agent 34 via communication network 14. Communication network 14 may be a public network, such as the internet, or a private network such as a private network operated by an enterprise. (The enterprise may be a data holder that owns data that was used to train user-side models and assistant-side models as discussed elsewhere herein.) Chat agent 34 may use updated central model 38, which may be running on, or hosted from, server 37, which may be a parameter server as discussed elsewhere herein, or which may be part of a computing system that does not comprise a parameter server. In the embodiment shown, query messages entered by user 4A into an interface of chat application 8 may be transmitted via network 14 to server 37, where chat agent application 34 determines a response message to send in reply to the query message, the chat agent application may determine the response message using updated central model 38, and thus the reply message may be based on updated parameters of the update central model, which in turn may be based on trained assistant-side models that were trained according to a two-sided modeling technique as described herein in reference to other figures. Thus, although sensitive data may not have been used to train the assistant side models, which in turn were used to arrive at updated central model 38, sensitive data entered by user 4A when the user is seeking a real-time answer in response to his, or her, query message, may be provided by chat assistant 34. In another embodiment, instead of sensitive information that was entered by user 4A into user chat application 8 being included in a query message sent from user device 6 to server 37, a context that is based on the sensitive information entered by the user may be transmitted to the server instead. Thus, as the updated central model was trained based on contexts that correspond to sensitive data that are part of conversations of a training corpus/data set but not trained based on actual sensitive information that the contexts correspond to, so too does the central model generate reply messages to query messages that contain contexts, or context information, that correspond(s) to sensitive information input by a user seeking real time responses to his, or her, queries, without the sensitive information actually being forwarded from user device 8 to computing device 37.

Figure 5B:
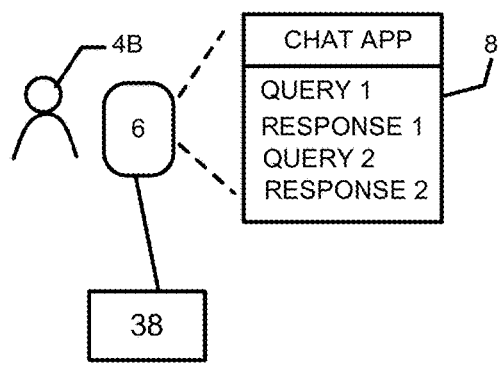
FIG. 5B illustrates an embodiment system using a chat agent model, trained using two-sided modeling, that is running from a user device.

Turning now to FIG. 5B, the figure illustrates an embodiment where a user chat application 8 running on user device 6 may provide responses via the chat application to queries from the user that comprise sensitive information without transmitting the sensitive information from the user device. User device 6 may have received an updated central model, such as updated central model 38 described above. User chat application 8 may access the updated central model on user device 6 and generate query contexts based on sensitive information input to the chat application and the updated central model running on the user device may generate responses to the query contexts based on the contexts instead of based on the sensitive information.

Figure 6:
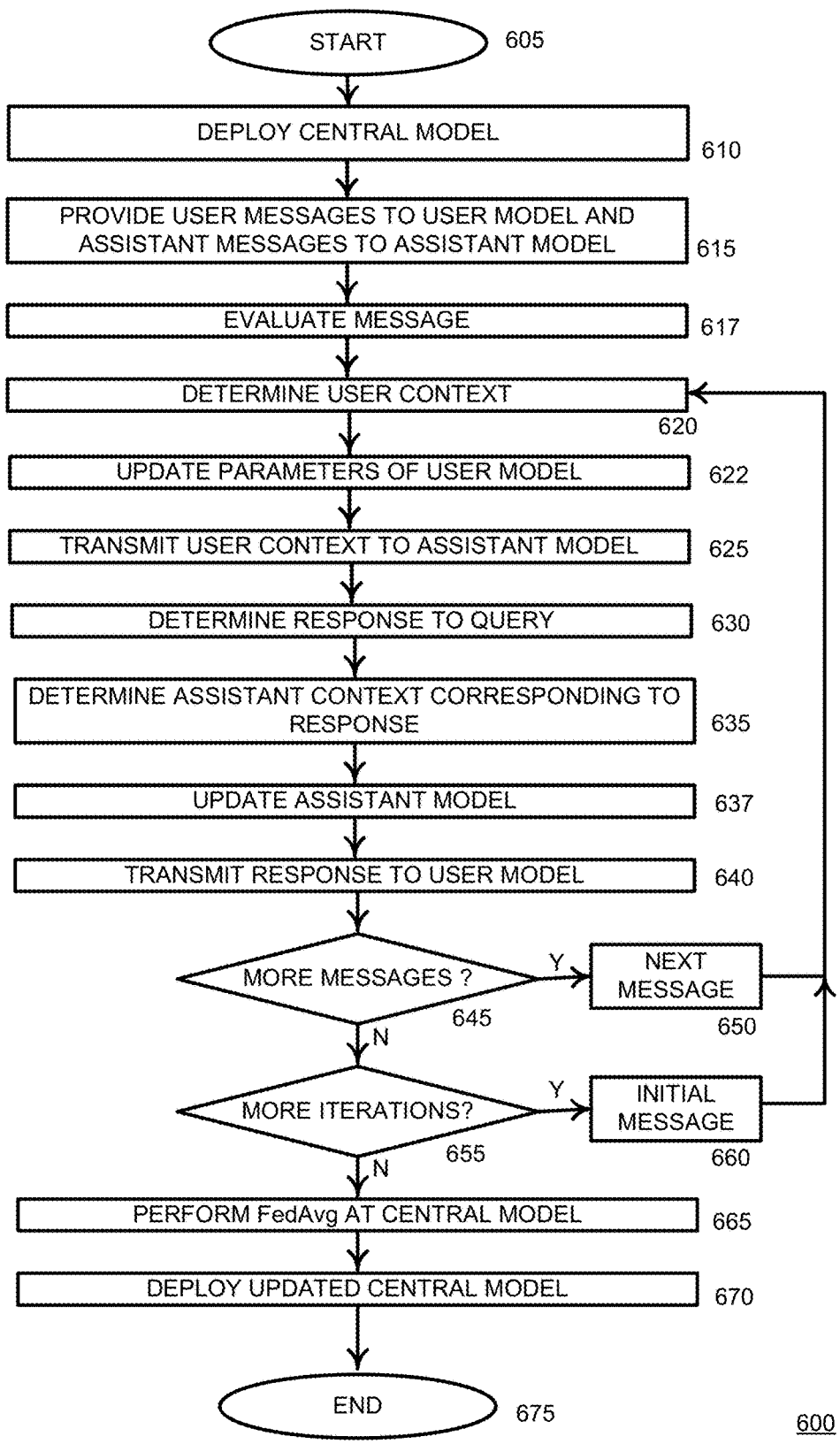
FIG. 6 illustrates an embodiment method using a chat agent trained using two-sided modeling.

Turning now to FIG. 6, the figure illustrates an embodiment method 600 that may be used to train a central model using a two-sided modeling technique, or framework, that does not share sensitive information that is input to a model of the two-sided modeling framework with another model of the two-sided modeling framework. Method 600 begins at step 605. At step 610 a central learning model is deployed to models of a two-sided modeling framework. The models of the two-sided modeling framework may comprise a user model and an assistant model. The central model and the two models of the two-sided modeling framework may comprise the same learning model, that may be based on, for example, a GPT-2 model, with the two models and the central model initialized with the same parameters/gradients. To train the user model and the assistant model a corpus of conversation data may be used. The conversation data may comprise sensitive information and may be owned by a data owner, or data holder, that desires to protect the privacy of the sensitive information of a user, or entity, that may have uttered the sensitive information during a conversation. It will be appreciated that the corpus of conversation information may comprise previously stored conversation information or may comprise conversation utterances that are generated in real time as the models are being trained.

At step 615 user messages from the corpus are provided to the user model and reply messages responsive to the user messages are provided to an assistant model. It will be appreciated that during training, the user model and the assistant model may be executing on the same computing device, may be executing on different computing devices that may be part of the same computing system, or the user model and the assistant model may be executing on different computing devices that are part of respectively different computing systems that may be coupled via a communication network. User messages may be referred to as queries and the reply messages may be referred to as response messages that are responsive to the queries. The queries and responses thereto may have been generated during a conversation between a user and an agent of the data owner. The agent of the data owner that was engaged with the user during the conversation, the messages of which may be part of the corpus of conversations, may have been a live person typing in a chat box or may have been an automated chat agent that was generating replies in response to queries from a user. As discussed previously, the user messages, or queries, and the chat agent responses, may be part of the conversation stored in the corpus conversations. The first message of a conversation of the corpus is made ready for evaluation and evaluated by the user model at step 617.

At step 620 the first message, which may be referred to as a first query of the conversation being used to train the user and assistant models, of the given conversation from the corpus of messages may be processed by the user model to determine a first user context, or first query context, that corresponds to the first user message or first query of the corpus. The first user context may comprise context information such as keys and values that the user model generates based on the language of the first query of the conversation.

(Similarly, a first assistant context may comprise keys and values information generated by the assistant model that corresponds to language of a first response message that was responsive to the first query.) At step 622 parameters of the user model may be updated based on the determined context. At step 625 the first user context is transmitted to the assistant model. Actual language that was part of the conversation of the corpus that was analyzed at step 620 is not transmitted to the assistant model at step 625.

At step 630 the assistant model, or chat agent model, may determine from the corpus of conversation messages a first response to the first query. In an embodiment, the assistant model may analyze the first user context that was transmitted from the user model at step 625 as part of determining the first response message. The first response determined at step 630 is not determined by analyzing actual language, which may be sensitive information, of the conversation that was used to generate the first user context at step 620. At step 635 the assistant-side model determines a first assistant context that corresponds to the first response that is determined in response to the first user context at step 630. The first assistant context may include the first user context. At step 637 parameters of the assistant model may be updated based on the determined first assistant context. At step 640 the context that corresponds to the response that was generated at step 630 is transmitted to the user model. At step 645 a determination is made whether more messages of the conversation exist. The determination at step 645 may be performed by the user model, or a response message sent from the assistant model at step 640 may contain an instruction to the user model that there are no further messages of the conversation that need to be processed for purposes of training the user model and the assistant model based on the conversation. If the determination at step 645 is yes, a second set of query/response messages of the conversation in the corpus is selected for evaluation by the user and assistant models at step 650 and steps 628 through 640 repeat for other query/response messages of the conversation. It will be appreciated that for a second query/response message set, references to the first user query, the first user context, the first assistant response, and the first assistant context during a first iteration of steps 620-640 would be referred to, respectively, in reference to steps 620-640 for a second iteration as a second user query, a second user context, a second assistant response, and second assistant context, and for a third query/response message set as a third user query, a third user context, a third assistant response, a third assistant context, and so on.

If the determination made at step 645 is no (e.g., no more messages in the conversation are to be processed), method 600 advances to step 655. At step 655 a determination is made whether further iterations of steps 620 through 645 are to be performed. For example, a training operation may be configured so that a determined number of iterations of steps 620 through 645 are performed to increase accuracy of parameters determined by the user model and the assistant model during training. If the determination at step 655 is yes (that more iterations are to be performed), the training operation sets a message of the conversation as the first message to be evaluated at step 660 and method 600 returns to step 620 and steps 620 through 645/650 repeat. It will be appreciated that the conversation to be evaluated during the reperforming of steps 620 through 645/650 may be the same conversation that was evaluated during previous iteration or may be a different conversation than a conversation evaluated during a previous iteration.

If the determination made at step 655 is no (e.g., that no further iterations of steps 620 through 645/650 are to be performed), method 600 advances to step 665. At step 665, a central model that has not yet been updated during the performance of steps 620-655 may be updated with parameters from one or more models that may have performed some, or all, of steps 617 through 655. In an embodiment, the central model is updated based only on parameters from one or more assistant-side models. In an embodiment, the updating of the central model at step 665 may comprise performing an algorithm on one or more values, keys, or other information, for one or more parameters/gradients of one or more assistant models that have performed one or more previous steps of method 600 to result in an updated central model. In an embodiment, the updating of the central model at step 665 may comprise performing an algorithm on one or more values, keys, or other information, for one or more parameters/gradients of one or more user models that have performed one or more previous steps of method 600 to result in an updated central model. The algorithm performed at step 665 may comprise a FedAvg algorithm. At step 670, the updated central model may be deployed to user devices, or to a computer system device that is accessible via a communication network, to facilitate a user obtaining assistance from a chat agent, or chat bot, (which may be facilitated by the updated central model running on a server that is physically or logically remote from the user), without the user needing to transmit sensitive information to the remotely located updated central model. Method 600 ends at step 675.

Figure 7:
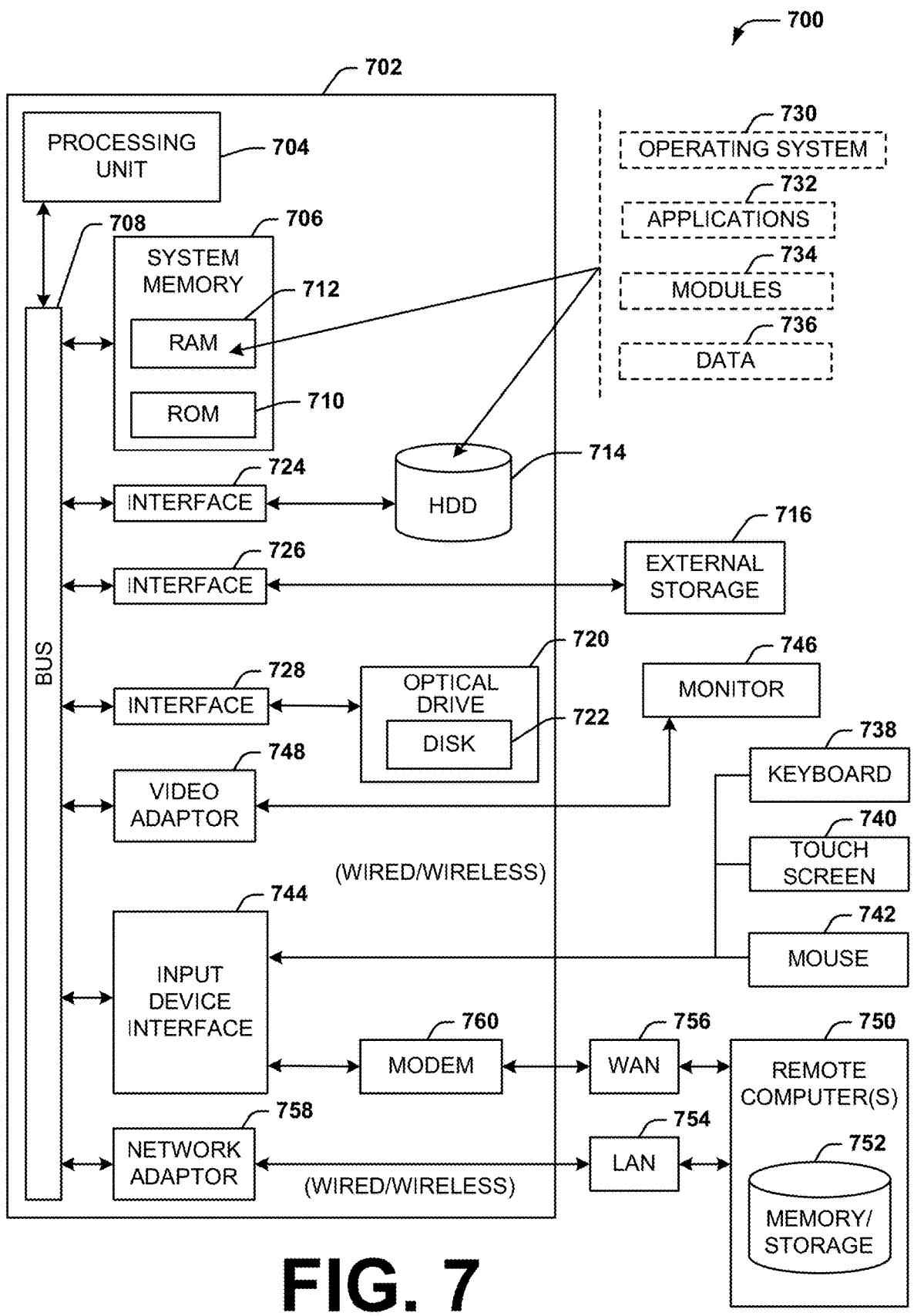
FIG. 7 illustrates a computer environment.

In order to provide additional context for various embodiments described herein, FIG. 7 and the following discussion are intended to provide a brief, general description of a suitable computing environment 700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 612 can also include a high-speed RAM such as static RAM for caching data.

Computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 608 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 8:
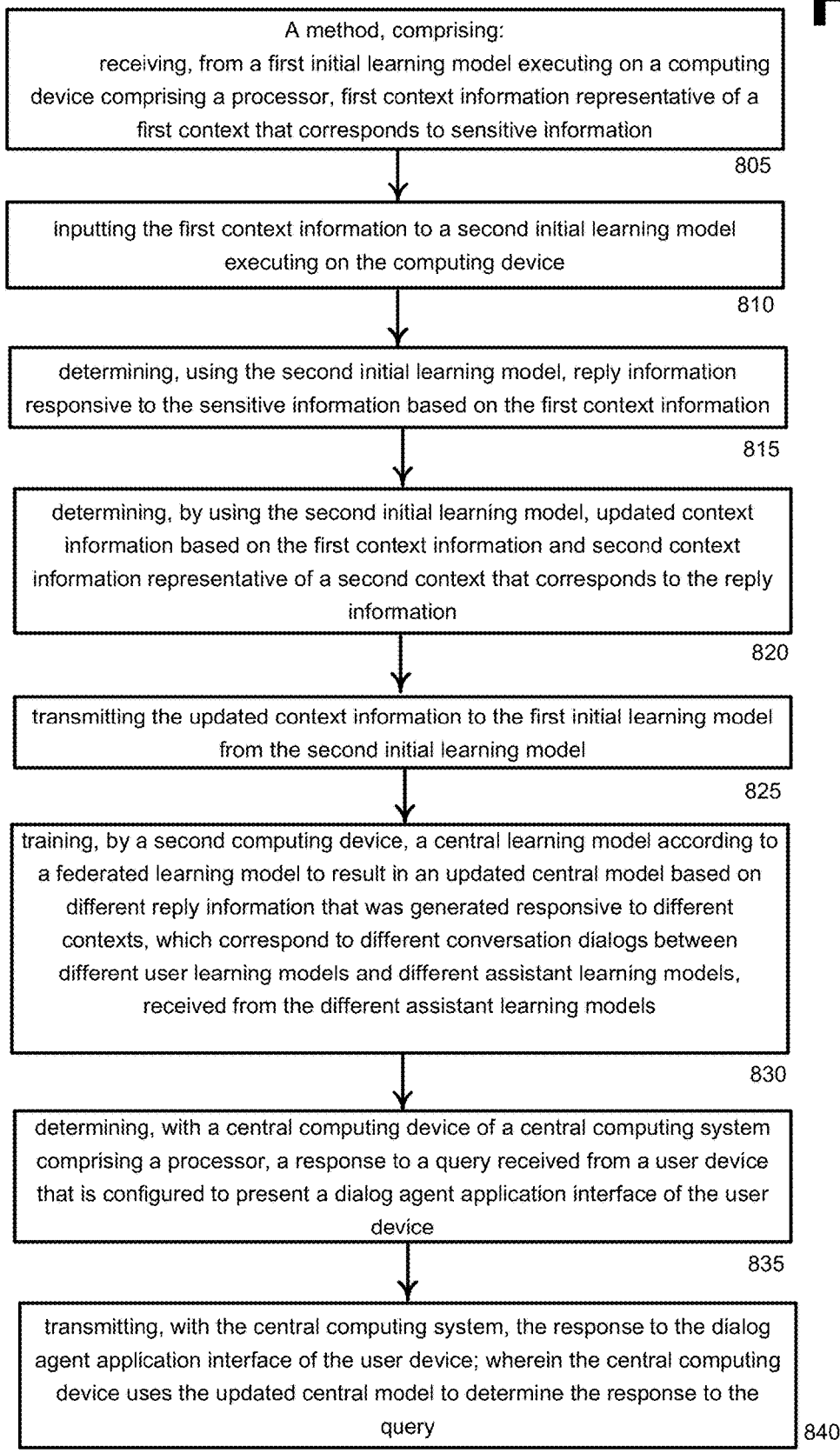
FIG. 8 illustrates a block diagram of a method embodiment.

Turning now to FIG. 8, the figure illustrates an exemplary embodiment method 800 comprising at block 805 receiving, from a first initial learning model executing on a computing device comprising a processor, first context information representative of a first context that corresponds to sensitive information; at block 810 inputting the first context information to a second initial learning model executing on the computing device; and a block 815 determining, using the second initial learning model, reply information responsive to the sensitive information based on the first context information. Method 800 may further comprise at block 820 determining, by using the second initial learning model, updated context information based on the first context information and second context information representative of a second context that corresponds to the reply information; and at block 825 transmitting the updated context information to the first initial learning model from the second initial learning model. Method 800 may further comprise at block 830 training, by a second computing device, a central learning model according to a federated learning model to result in an updated central model based on different reply information that was generated responsive to different contexts, which correspond to different conversation dialogs between different user learning models and different assistant learning models, received from the different assistant learning models. Method 800 may further comprise at block 835 determining, with a central computing device of a central computing system comprising a processor, a response to a query received from a user device that is configured to present a dialog agent application interface of the user device; and at block 840 transmitting, with the central computing system, the response to the dialog agent application interface of the user device; wherein the central computing device uses the updated central model to determine the response to the query.

Turning now to FIG. 9, the figure illustrates a computing system 900, comprising a computing device, comprising a processor configured to at block 905 receive, from a first initial learning model executing on the computing device, first context information representative of a first context that corresponds to sensitive information; at block 910 input the first context information to a second initial learning model executing on the computing device; and at block 915 determine, using the second initial learning model, reply information responsive to the sensitive information based on the first context information. The processor of computing device of system 900 may be further configured to, at block 920 determine, by using the second initial learning model, updated context information based on the first context information and second context information representative of a second context that corresponds to the reply information; and at block 925 transmit the updated context information to the first initial learning model from the second initial learning model. The processor of computing device of system 900 may be further configured to, at block 930, train the second initial learning model based on the reply information to result in an updated second learning model. At block 935 parameters corresponding to the updated second learning model are combined with parameters from other models to result in an updated central learning model.

Figure 10:
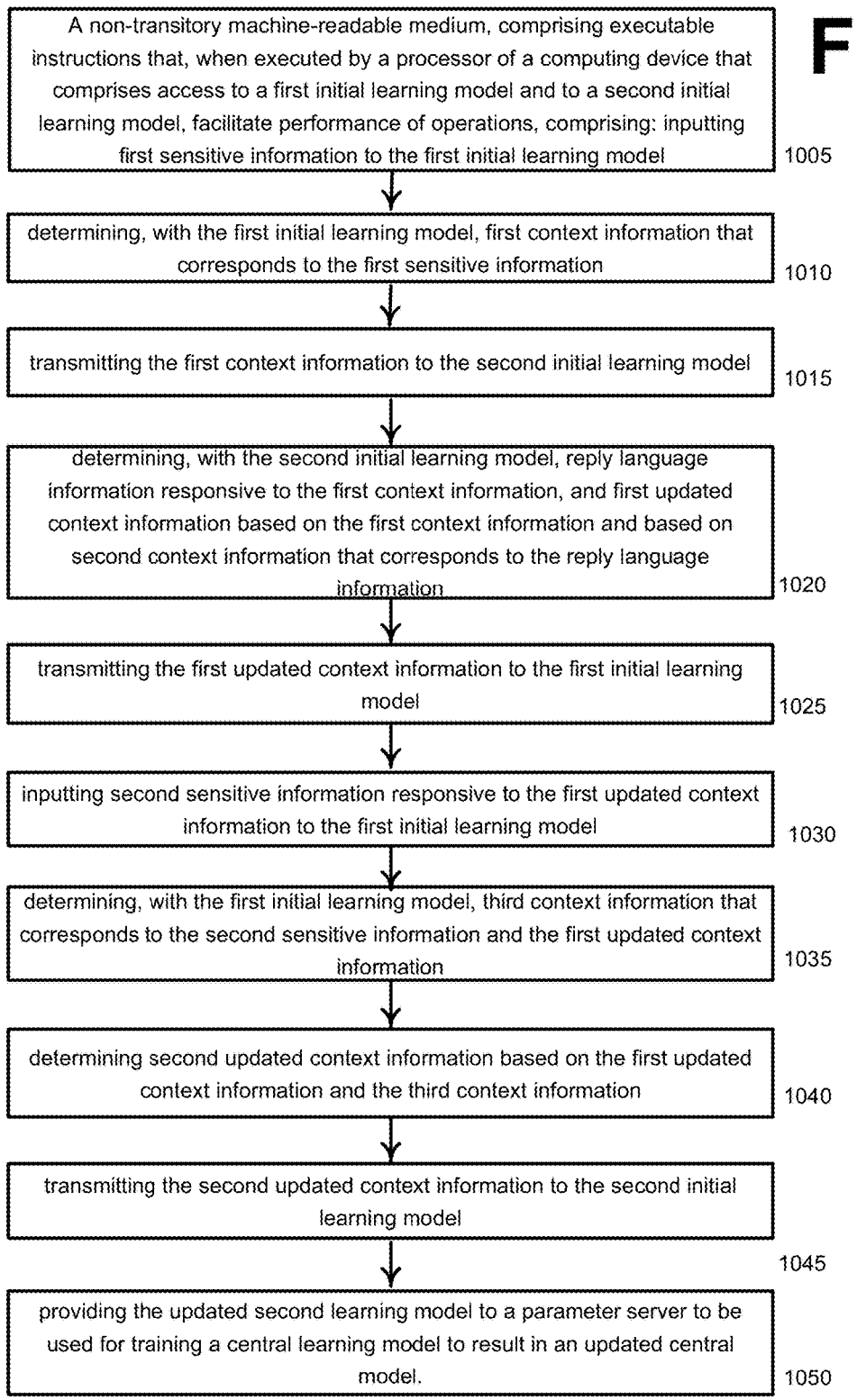
FIG. 10 illustrates a block diagram of a method that may be embodied in machine readable media.

Turning now to FIG. 10, the figure illustrates at block 1005 a non-transitory machine-readable medium, comprising executable instructions that, when executed by a processor of a computing device that comprises access to a first initial learning model and to a second initial learning model, facilitate performance of operations, comprising: inputting first sensitive information to the first initial learning model; at block 1010 determining, with the first initial learning model, first context information that corresponds to the first sensitive information; at block 1015 transmitting the first context information to the second initial learning model; at block 1020 determining, with the second initial learning model, reply language information responsive to the first context information, and first updated context information based on the first context information and based on second context information that corresponds to the reply language information; at block 1025 transmitting the first updated context information to the first initial learning model; at block 1030 inputting second sensitive information responsive to the first updated context information to the first initial learning model; at block 1035 determining, with the first initial learning model, third context information that corresponds to the second sensitive information and the first updated context information; at block 1040 determining second updated context information based on the first updated context information and the third context information; and at block 1045 transmitting the second updated context information to the second initial learning model. At block 1050 the executable instructions are configured to provide the updated second learning model to a parameter server to be used for training a central learning model to result in an updated central model.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form. The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, from a first initial learning model executing on a first computing device comprising at least one processor, first context information representative of a first context that corresponds to sensitive information;
   transmitting, by the first computing device to a second computing device comprising a central learning model, the first context information;
   receiving, from the second computing device, a second initial learning model, wherein the second initial learning model resulted from the first context information having been input to the central learning model;
   inputting the first context information to the second initial learning model executing on the first computing device; and
   determining, using the second initial learning model, reply information responsive to the sensitive information based on the first context information,
   wherein the first context information is derived from the sensitive information, and wherein the first context information does not comprise the sensitive information.

2. The method of claim 1, further comprising:
   determining, by using the second initial learning model, updated context information based on the first context information and second context information representative of a second context that corresponds to the reply information; and
   transmitting the updated context information to the first initial learning model from the second initial learning model.

3. The method of claim 1, further comprising training, by the computing device, the second initial learning model based on the reply information to result in an updated second learning model.

4. The method of claim 3, wherein the sensitive information input to the first initial learning model is not used to train the second initial learning model that results in the updated second learning model.

5. The method of claim 1, wherein the second initial learning model does not receive the sensitive information.

6. The method of claim 1, wherein the first initial learning model and the second initial learning model comprise a pre-trained language model.

7. The method of claim 6, wherein the pre-trained language model comprises a generative pre-trained transformer model.

8. The method of claim 1, further comprising training, by the second computing device, the central learning model according to a federated learning model to result in an updated central model based on different reply information that was generated responsive to different contexts, which correspond to different conversation dialogs between different user learning models and different assistant learning models, received from the different assistant learning models.

9. The method of claim 8, further comprising:
   determining, with a central computing device of a central computing system comprising a processor, a response to a query received from a user device that is configured to present a dialog agent application interface of the user device; and
   transmitting, with the central computing system, the response to the dialog agent application interface of the user device;
   wherein the central computing device uses the updated central model to determine the response to the query.

10. The method of claim 8, further comprising:
    determining a response to a query input to a dialog agent of a user device that comprises a processor and that is configured to present a dialog agent application interface of the user device;
    wherein the user device uses the updated central model to determine the response to the query.

11. A computing system, comprising at least one processor configured to:
receive, from a first initial learning model executing on a computing device, first context information representative of a first context that corresponds to sensitive information;
transmit, to a central server comprising a central learning model, the first context information;
receive a second initial learning model that was directed by the central server to the computing device, wherein the second initial learning model results from the first context information being input to the central learning model;
input the first context information to the second initial learning model executing on the computing device; and
determine, using the second initial learning model, reply information responsive to the sensitive information based on the first context information,
wherein the first context information is derived from the sensitive information and wherein the first context information does not comprise the sensitive information.

12. The computing system of claim 11, wherein the at least one processor is further configured to:
determine, by using the second initial learning model, updated context information based on the first context information and second context information representative of a second context that corresponds to the reply information; and
transmit the updated context information to the first initial learning model from the second initial learning model.

13. The computing system of claim 11, wherein the at least one processor is further configured to train the second initial learning model based on the reply information to result in an updated second learning model.

14. The computing system of claim 13, wherein the sensitive information input to the first initial learning model is not used in the training of the learning model that results in the updated second learning model.

15. The computing system of claim 11, wherein the first initial training model and the second initial training model comprise a pre-trained central language model.

16. The computing system of claim 13, wherein parameters corresponding to the updated second learning model are combined with parameters from other models to result in an updated central learning model.

17. A non-transitory machine-readable medium, comprising executable instructions that, when executed by at least one processor of a computing device that comprises access to a first initial learning model and to a second initial learning model, facilitate performance of operations, comprising:
inputting first sensitive information to the first initial learning model;
determining, with the first initial learning model, first context information that corresponds to the first sensitive information;
transmitting the first context information to the second initial learning model;
determining, with the second initial learning model, reply language information responsive to the first context information, and first updated context information based on the first context information and based on second context information that corresponds to the reply language information;
transmitting the first updated context information to the first initial learning model;
inputting second sensitive information responsive to the first updated context information to the first initial learning model;
determining, with the first initial learning model, third context information that corresponds to the second sensitive information and the first updated context information;
determining second updated context information based on the first updated context information and the third context information; and
transmitting the second updated context information to the second initial learning model,
wherein the first context information does not comprise the first sensitive information, wherein the third context information does not comprise the first sensitive information or the second sensitive information, wherein the first context information comprises at least one first key-value pair derived by the first initial learning model based on the first sensitive information, wherein the second context information comprises at least one second key-value pair derived by the second initial learning model based on the reply language information, wherein the first updated context information comprises at least one third key-value pair derived by the second initial learning model based on the at least one first key-value pair and the at least one second key-value pair, and wherein the third context information comprises at least one fourth key-value pair derived by the first initial learning model based on the second sensitive information and the at least one third key-value pair.

18. The non-transitory machine-readable medium of claim 17, wherein the executable instructions further facilitate operations, comprising:
training the second initial learning model based on the first context information, the second context information, and the third context information to result in an updated second learning model.

19. The non-transitory machine-readable medium of claim 17, wherein the executable instructions are configured not to train the second initial learning model on the first sensitive information or on the second sensitive information.

20. The non-transitory machine-readable medium of claim 17, wherein the executable instructions are configured to provide the updated second learning model to a parameter server to be used for training a central learning model to result in an updated central model.

* * * * *